US008527081B2

(12) United States Patent
Hardy et al.

(10) Patent No.: US 8,527,081 B2
(45) Date of Patent: Sep. 3, 2013

(54) METHOD AND APPARATUS FOR AUTOMATED VALIDATION OF SEMICONDUCTOR PROCESS RECIPES

(75) Inventors: Charles Hardy, San Jose, CA (US); Roger Alan Lindley, Santa Clara, CA (US)

(73) Assignee: Applied Materials, Inc., Santa Clara, CA (US)

( * ) Notice: Subject to any disclaimer, the term of this patent is extended or adjusted under 35 U.S.C. 154(b) by 253 days.

(21) Appl. No.: 13/044,747

(22) Filed: Mar. 10, 2011

(65) Prior Publication Data
US 2012/0053719 A1 Mar. 1, 2012

Related U.S. Application Data

(60) Provisional application No. 61/378,561, filed on Aug. 31, 2010.

(51) Int. Cl.
*G06F 19/00* (2011.01)
(52) U.S. Cl.
USPC ............................ 700/104; 700/103; 700/117
(58) Field of Classification Search
USPC .................................. 700/103–106, 117, 121
See application file for complete search history.

(56) References Cited

U.S. PATENT DOCUMENTS

| 7,225,047 | B2 |   | 5/2007  | Al-Bayati et al. |        |
|-----------|----|---|---------|------------------|--------|
| 7,333,871 | B2 |   | 2/2008  | Schwarm          |        |
| 7,477,960 | B2 | * | 1/2009  | Willis et al.    | 700/121 |
| 7,570,796 | B2 | * | 8/2009  | Zafar et al.     | 382/144 |
| 7,783,375 | B2 |   | 8/2010  | Shanmugasundram et al. | |
| 7,987,012 | B2 | * | 7/2011  | Morisawa et al.  | 700/95  |
| 2004/0185583 | A1 | * | 9/2004  | Tomoyasu et al. | 438/8 |
| 2006/0015206 | A1 | * | 1/2006  | Funk et al.      | 700/121 |
| 2006/0184264 | A1 | * | 8/2006  | Willis et al.    | 700/108 |
| 2007/0230770 | A1 | * | 10/2007 | Kulkarni et al.  | 382/149 |
| 2008/0306615 | A1 | * | 12/2008 | Morisawa et al.  | 700/18  |
| 2009/0143999 | A1 |   | 6/2009  | Karthikeyan et al. | |
| 2009/0297019 | A1 | * | 12/2009 | Zafar et al.     | 382/145 |
| 2010/0119144 | A1 | * | 5/2010  | Kulkarni et al.  | 382/149 |
| 2011/0286656 | A1 | * | 11/2011 | Kulkarni et al.  | 382/144 |
| 2011/0307089 | A1 | * | 12/2011 | Tomoyasu et al.  | 700/103 |

OTHER PUBLICATIONS

International Search Report and Written Opinion mailed Mar. 27, 2012 for PCT Application No. PCT/US2011/049918.

* cited by examiner

*Primary Examiner* — Ramesh Patel
(74) *Attorney, Agent, or Firm* — Moser Taboada; Alan Taboada

(57) ABSTRACT

Methods and apparatus for automated validation of semiconductor process steps are provided herein. In some examples, a method for validating a semiconductor process recipe includes: selecting a rule set describing an operating window for a semiconductor process tool; checking parameter values defined by steps in the semiconductor process recipe against limit-checking rules of the rule set to produce first results; determining step types from the steps in the semiconductor process recipe using step definition rules of the rule set to produce second results; checking transitions between the step types against step transition rules of the rule set to produce third results; and generating, using the computer, validation data for use of the semiconductor process recipe with the semiconductor process tool based on the first, the second, and the third results.

20 Claims, 3 Drawing Sheets

METHOD AND APPARATUS FOR AUTOMATED VALIDATION OF SEMICONDUCTOR PROCESS RECIPES

CROSS-REFERENCE TO RELATED APPLICATIONS

This application claims benefit of U.S. provisional patent application Ser. No. 61/378,561, filed Aug. 31, 2010, which is herein incorporated by reference.

FIELD

Embodiments of the present invention generally relate to a method and apparatus for automated validation of semiconductor process recipes.

BACKGROUND

The process of manufacturing semiconductor devices can require many sequential steps accounting for hundreds or even thousands of process variables. Further, tools used carry out the process steps have various specifications, limitations, and requirements that add further variables to the manufacturing process. Thus, process engineers produce semiconductor process recipes ("recipes") that dictate the process steps and how such steps are to be performed for each tool used in the process.

An incorrect recipe can result in poor results and possibly even damage to the semiconductor wafers being processed. The allowable operating window for a given tool may be well-defined, but also quite complex. Due to such complexity, process engineers can mistakenly create a recipe that is incorrect in some way or otherwise falls outside of the defined operating window for the tool. Thus, recipes must be validated before they are used during manufacturing.

Typically, recipes are validating manually, whereby the process engineer cross-references the recipe with documents detailing the specifications and operating window of a particular tool. Manually validating a recipe is labor-intensive and error-prone. Attempts to automate the recipe validation process have typically centered on using a spreadsheet to verify that recipe parameters fall within allowed limits. While this provides some degree of validation, such a process can be inadequate if there are complex conditions involving combinations of several parameters. Even more difficult is validating that the order and types of steps in a recipe meet the operating window requirements of a given tool.

Accordingly, the inventors have provided an improved method and apparatus for automated validation of semiconductor process steps.

SUMMARY

Methods and apparatus for automated validation of semiconductor process steps are provided herein. In some embodiments, a method for validating a semiconductor process recipe (and a computer readable medium storing instructions for performing the method) includes: selecting a rule set describing an operating window for a semiconductor process tool; checking parameter values defined by steps in the semiconductor process recipe against limit-checking rules of the rule set to produce first results; determining step types from the steps in the semiconductor process recipe using step definition rules of the rule set to produce second results; checking transitions between the step types against step transition rules of the rule set to produce third results; and generating, using the computer, validation data for use of the semiconductor process recipe with the semiconductor process tool based on the first, the second, and the third results.

In some embodiments, an apparatus for validating a semiconductor process recipe includes: a memory configured to store recipe checker software and a plurality of rule sets describing operating windows for semiconductor process tools; and a processor, coupled to the memory, configured to execute the recipe checker software to: select a rule set describing from the plurality of rule sets for a semiconductor process tool; check parameter values defined by steps in the semiconductor process recipe against limit-checking rules of the rule set to produce first results; determine step types from the steps in the semiconductor process recipe using step definition rules of the rule set to produce second results; check transitions between the step types against step transition rules of the rule set to produce third results; and generate validation data for use of the semiconductor process recipe with the semiconductor process tool based on the first, the second, and the third results.

Other and further embodiments of the present invention are described below.

BRIEF DESCRIPTION OF THE DRAWINGS

Embodiments of the present invention, briefly summarized above and discussed in greater detail below, can be understood by reference to the illustrative embodiments of the invention depicted in the appended drawings. It is to be noted, however, that the appended drawings illustrate only typical embodiments of this invention and are therefore not to be considered limiting of its scope, for the invention may admit to other equally effective embodiments.

Figure 1:
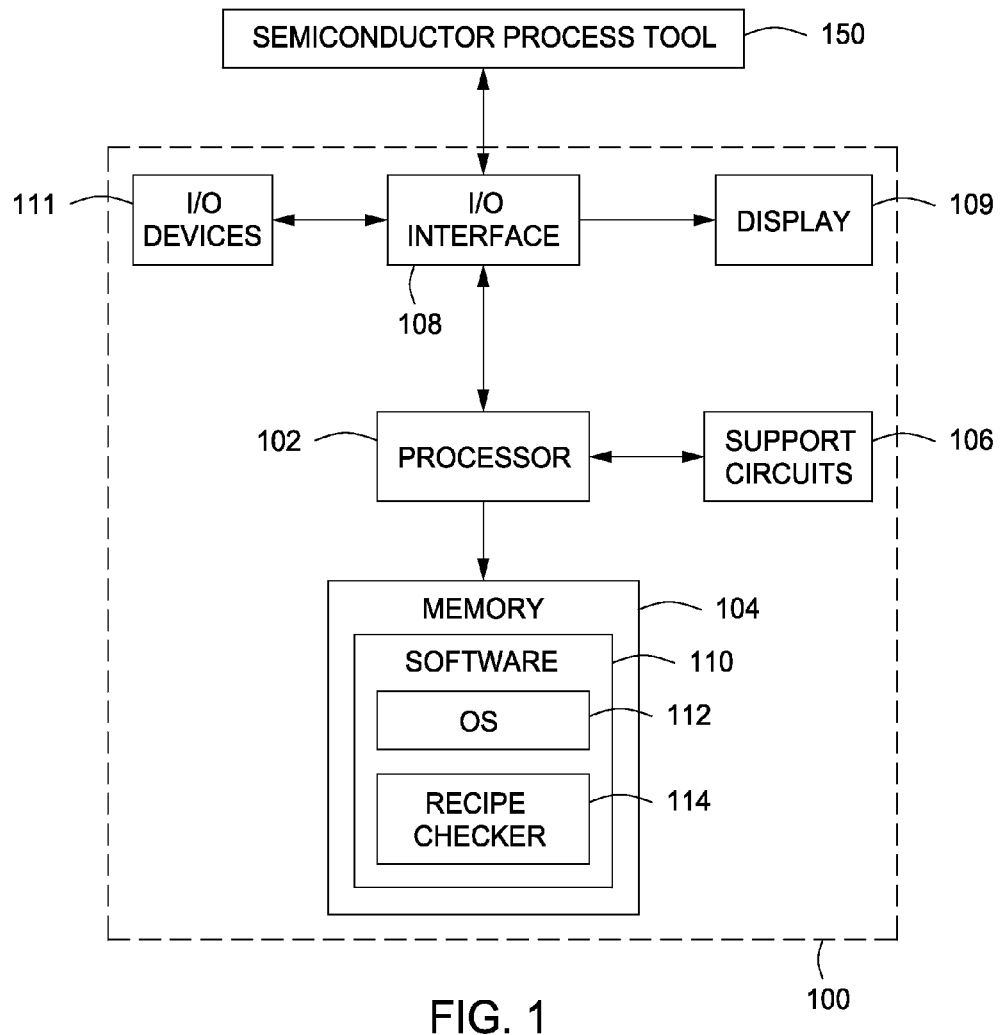
FIG. 1 is a block diagram depicting exemplary embodiments of a computing system.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

FIG. 1 is a block diagram depicting exemplary embodiments of a computing system 100. The computing system 100 includes a processor 102, a memory 104, various support circuits 106, an I/O interface 108, and a display 109. A "computer" as referred to herein can include at least the processor system 102 and the memory 104. In general, the processor 102 may include one or more central processing units (CPUs). A CPU includes a circuit configured to execute program instructions ("software"). The support circuits 106 for the processor 102 include conventional cache, power supplies, clock circuits, data registers, I/O interfaces, and the like. The I/O interface 108 may be directly coupled to the memory 104 or coupled through the processor 102. The I/O interface 108 can be coupled to the display 109 and the IO devices 111. The IO devices can include various input/output devices (e.g., keyboard, mouse, etc.). The memory 104 may include one or more of the following random access memory, read only memory, magneto-resistive read/write memory, optical read/write memory, cache memory, magnetic read/write memory, and the like.

The memory 104 stores software 110 that includes program instructions configured for execution by the processor 102. The software 110 can include an operating system (OS) 112 and a semiconductor process recipe checker tool ("recipe checker 114"). The OS 112 can provide an interface between the recipe checker 114 and the computing system 100. The OS 112 may be implemented using various operating systems known in the art. The recipe checker 114 can be executed by the processor 102 under control of the OS 112 to perform validation of semiconductor process recipes, as described in detail below.

In some embodiments, the computing system 100 can be coupled to a semiconductor process tool 150 through the IO interface 108. Thus, output of the computing system 100, in particular output produced by the recipe checker 114, can advantageously be used to control the semiconductor process tool 150 to perform semiconductor processing. The semiconductor process tool 150 can be any type of tool known in the art for processing and manufacturing semiconductor devices.

Figure 2:
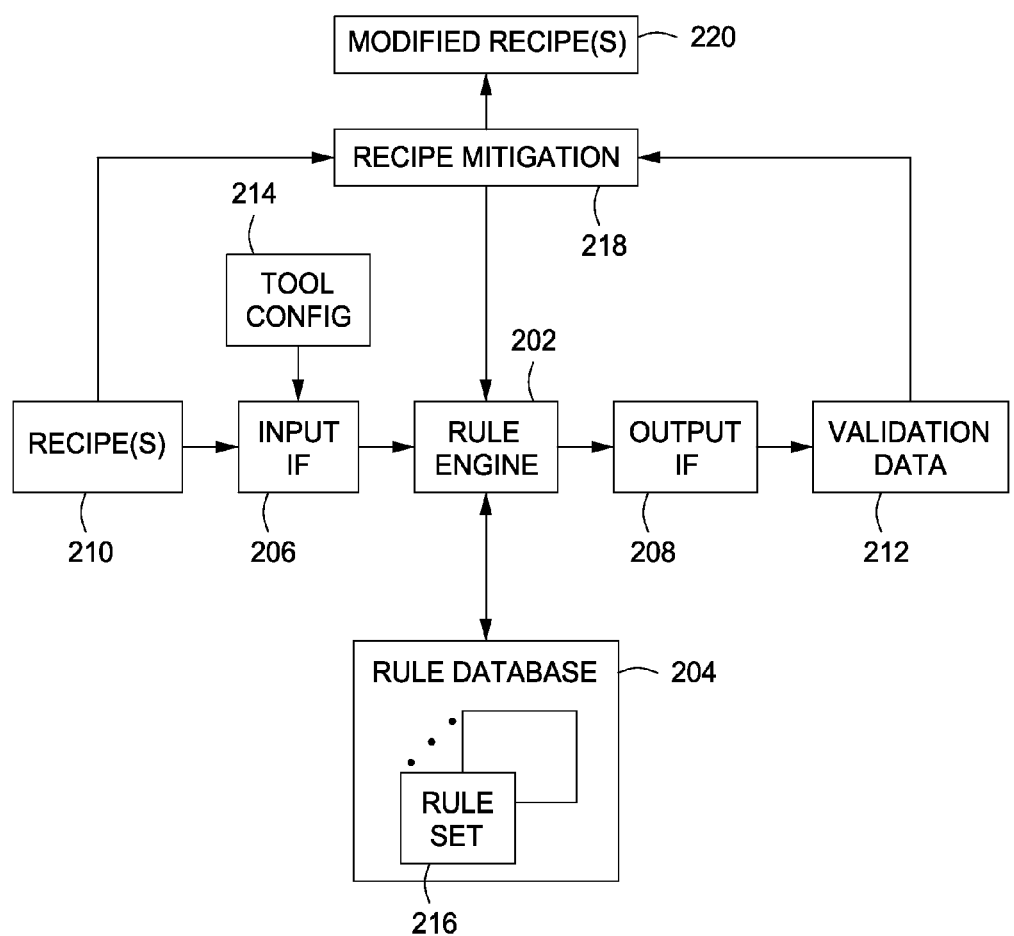
FIG. 2 is a block diagram depicting an embodiment of a recipe checker.

FIG. 2 is a block diagram depicting an embodiment of the recipe checker 114. The recipe checker 114 can include a rule engine 202, a rule database 204, an input interface ("input IF 206"), and an output interface ("output IF 208"). The rule database 204 can include a plurality of rule sets 216. The input IF 206 is configured to receive one or more recipes 210 and tool configuration data ("tool config 214"). The input IF 206 coupled the recipe(s) 210 and the tool config 214 to the rule engine 202. The rule engine 202 is configured to access the rule database 204 to obtain one or more of the rule sets 216. The rule engine 202 generates validation data 212, which is provided as output through the output IF 208. The input IF 206 and the output IF 208 may be part of a user interface, such as a graphic user interface (GUI) 116 that can be shown on the display 109 of the computing system 100.

In operation, the recipe(s) 210 describe one or more semiconductor process recipes. The recipe(s) 210 can be in any electronic format, such as a plain text file, an extensible markup language (XML) file, and the like. Each recipe describes a sequence of processing steps ("steps") to be performed on a semiconductor wafer by a semiconductor process tool ("process tool"). A step in a recipe may be defined by one or more instructions. An "instruction" describes an action to be performed by the tool and/or the configuration of one or more parameters associated with the process tool. For example, an instruction can describe an assignment of a value to a particular parameter of the process tool. As is well known in the art, a process tool can perform various actions, such as etching, deposition, and the like, each of which includes various parameters that can be set to different values, such as source power, bias power, process gas flow, process gas pressure, and the like. Thus, a step in a recipe can invoke an action and/or set various parameters of the process tool to achieve a desired semiconductor process.

Each process tool includes an "operating window" that defines constraints on the various actions and parameters (e.g., min/max values for the parameters, required and allowed actions and sequences of actions, etc.). The rule database 204 includes rule sets 216 for a plurality of process tools. Each rule set 216 describes an operating window for a particular process tool (or version of the process tool if the process tool has multiple versions or configurations). In general, the rule engine 202 checks the recipe(s) 210 against the rule sets 216 to determine whether the recipe(s) 210 are valid for their intended process tools. The tool config 214 provides configuration data for a particular process tool. The rule engine 202 can use the tool config 214 to select a particular rule set from the rule sets 216 that corresponds to that particular process tool as configured.

A rule set 216 includes various rules that define the operating window for the process tool as configured. A rule set 216 can include different types of rules. A "rule" defines a constraint associated with parameters and/or actions for the process tool. A rule can include a priority. For example, a rule can be defined as "severe" in that violation of such rule may cause damage to the process tool and/or the semiconductor wafer. A rule can be defined as "warning" in that violation of such a rule is not recommended, but otherwise possible. Those skilled in the art will appreciate that additional and/or different types of priority can be assigned to the rules.

In some embodiments, the rule set 216 includes limit-checking rules. A "limit-checking rule" can define constraints for a particular variable parameter of the process tool. For example, one limit-checking rule can define a minimum pressure to be maintained in the chamber of the process tool during processing. Another limit-checking rule can define a maximum of such pressure. Another limit-checking rule can define a minimum/maximum gas flow. Those skilled in the art will appreciate that various limit-checking rules can be formed for various parameters of a particular process tool.

In some embodiments, the rule set 216 includes step definition rules. A "step definition rule" can define a set of requirements for a step type. A "step type" is an action that can be performed by the process tool. For example, an etch chamber can perform a source etch step, a bias etch step, a flush step, clean step, and the like. Each step type is defined by the setting of particular parameters of the tool and the values assigned to such parameters. The requirements defined by the step definition rule dictate which parameters and their values result in the particular step type. For example, a source power of "x" watts, a bias power of "y" watts, and a gas flow of "z" sccm may be classified as a source etch step type and the requirements in the step definition rule can be set accordingly. A source power of "a" watts, a bias power of "b" watts, and a gas flow of "c" sccm may be classified as a bias etch step type and the requirements in the step definition rule can be set accordingly. Those skilled in the art will appreciate that a given process tool can have various step types, and that step definition rules can be defined to classify such step types.

In some embodiments, the rule set 216 includes step transition rules. A "step transition rule" can define allowed and required transitions between step types. A process tool can perform various step types, but not necessarily in any sequence. The operating window of the process tool can define allowed and/or required transitions between step types. For example, a step transition rule can define that step A followed by step B is allowed. Another step transition rule can define that step C followed by step E is not allowed, but rather a step D must be performed between steps C and E.

Those skilled in the art will appreciate that the rule sets 216 can include various implementations of the limit-checking, step definition, and step transition rules discussed above. For example, any of the rules can be configured with different rules for different variants of a process tool. Any of the rules can be configured with dependency information, e.g., if a process tool has a certain feature, then that feature must be configured accordingly.

In operation, the rule engine 202 applies each recipe 210 against the appropriate rule set 216 to determine if the recipe 210 is valid. In some embodiments, the rule engine 202 checks parameter values defined by the steps in the recipe against limit-checking rules to produce first results indicating violations (if any) of such rules. The rule engine 202 can then determine step types in the recipe using step definition rules to produce second results classifying the steps in the recipe into particular step types. The rule engine 202 can then check transitions between step types against step transition rules to produce third results indicating violations (if any) of such rules. The rule engine 202 can then generate the validation data 212 for use of the recipe with the particular process tool as configured based on the first, second, and third results.

The validation data 212 can indicate error(s) (if any) describing violation of at least one rule in the applied rule set. In some embodiments, the error indication(s) can further describe modification(s) of the recipe necessary to obviate the violation. The validation data 212 is provided as output through the output IF 208. For example, the validation data 212 can be display to the user via a GUI so the user can observe the violations and the potential modifications required to produce a valid recipe.

In some embodiments, the recipe checker 114 includes a recipe mitigation module 218. The recipe mitigation module 218 is configured to receive the validation data 212 and the recipe(s) 210. The recipe mitigation module 218 is configured to modify recipe(s) that have been indicated as invalid. For example, the recipe mitigation module 218 can advantageously identify the violation and recommended modifications in the validation data 212, and automatically modify the offending recipe to obviate the violation. The recipe mitigation module 218 can modify by changing parameter values, inserting steps, removing steps, re-arranging steps, and the like so that the recipe will satisfy the particularly applied rule set. The recipe mitigation module 218 produces modified recipe(s) 220 as output.

Figure 3:
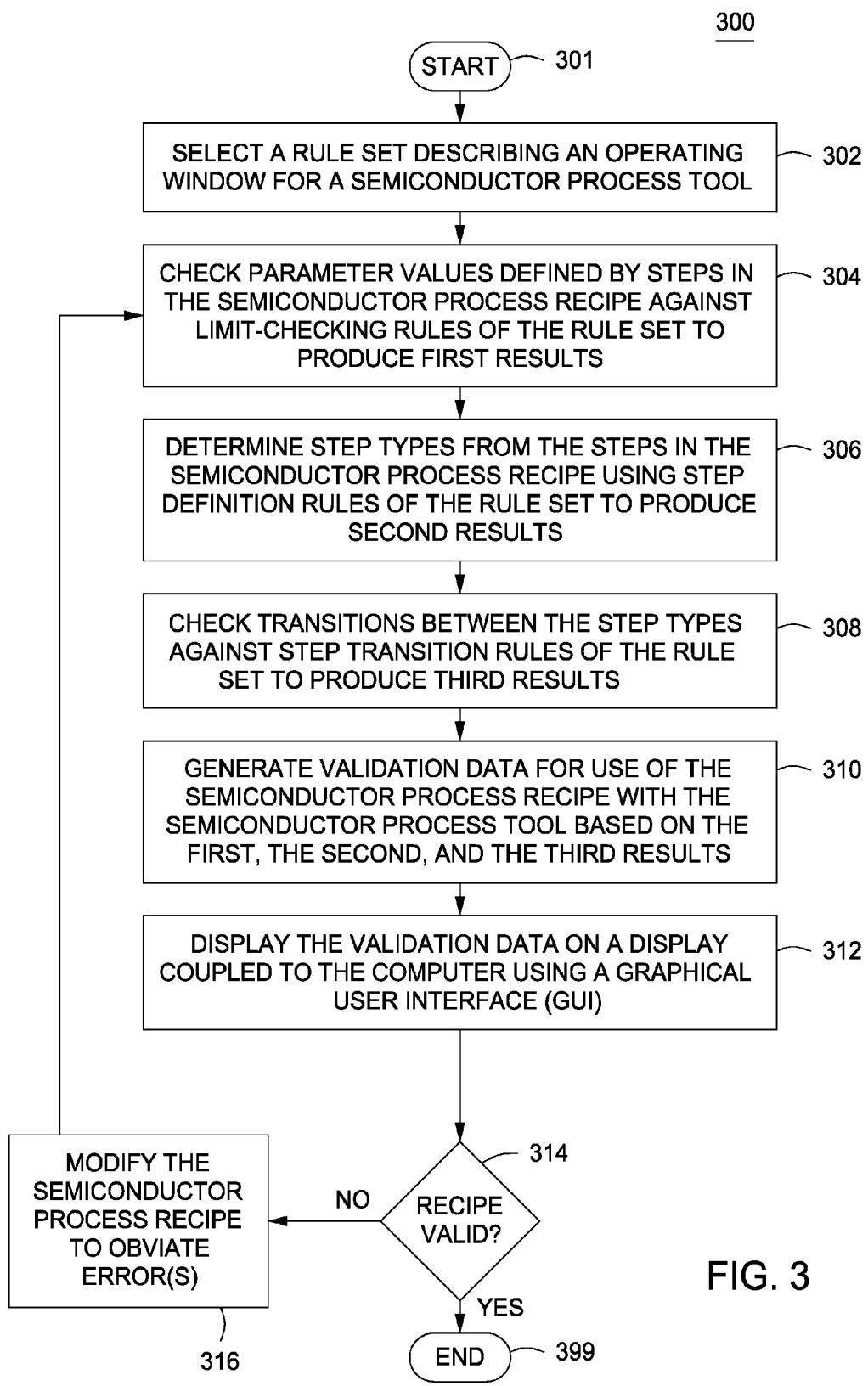
FIG. 3 is a flow diagram depicting an embodiment of a method for validating a process recipe.

FIG. 3 is a flow diagram depicting an embodiment of a method 300 for validating a process recipe. The method 300 may be performed by the computing system 100 described above. The method 300 begins at 301. At 302, a rule set is selected describing an operating window for a semiconductor process tool. In some embodiments, the rule set can be selected based on tool configuration data. At 304, parameter values defined by steps in the semiconductor process recipe are checked against limit-checking rules of the rule set to produce first results. At 306, step types are determined from the steps in the semiconductor process recipe using step definition rules of the rule set to produce second results. At 308, transitions between the step types are checked against step transition rules of the rule set to produce third results. At 310, validation data is advantageously generated for use of the semiconductor process recipe with the semiconductor process tool based on the first, the second, and the third results.

The method 300 can include 312, where the validation data is displayed on a display coupled to the computer using a GUI. The method 300 can include 314-316. At 314, a determination is made whether the recipe has been indicated as valid. If so, the method 300 ends at 399. Otherwise, the method 300 proceeds to 316. At 316, the semiconductor process recipe is advantageously modified to obviate error(s) described by the validation data. The method 300 can then return to 304 and be repeated.

An aspect of the invention is implemented as a program product for use with a computer system. Program(s) of the program product defines functions of embodiments and can be contained on a variety of computer readable media, which include, but are not limited to: (i) information permanently stored on non-writable storage media (e.g., read-only memory devices within a computer such as CD-ROM or DVD-ROM disks readable by a CD-ROM drive or a DVD drive); and (ii) alterable information stored on writable storage media (e.g., floppy disks within a diskette drive or hard-disk drive or read/writable CD or read/writable DVD). Such computer readable media, when carrying computer-readable instructions that direct functions of the invention, represent embodiments of the invention.

While the foregoing is directed to embodiments of the present invention, other and further embodiments of the invention may be devised without departing from the basic scope thereof.

The invention claimed is:

1. A computer-implemented method of validating a semiconductor process recipe, comprising:
selecting a rule set describing an operating window for a semiconductor process tool;
checking parameter values defined by steps in the semiconductor process recipe against limit-checking rules of the rule set to produce first results;
determining step types from the steps in the semiconductor process recipe using step definition rules of the rule set to produce second results;
checking transitions between the step types against step transition rules of the rule set to produce third results; and
generating, using the computer, validation data for use of the semiconductor process recipe with the semiconductor process tool based on the first, the second, and the third results.

2. The method of claim 1, wherein the step of selecting comprises:
obtaining configuration data for the semiconductor process tool; and
selecting the rule set from a plurality of rule sets based on the configuration data.

3. The method of claim 1, wherein the limit-checking rules define constraints for variable parameters of the semiconductor process tool.

4. The method of claim 1, wherein the step definition rules define a set of requirements for each of the step types.

5. The method of claim 1, wherein the step transition rules define allowed and required transitions between step types.

6. The method of claim 1, wherein the validation data includes at least one error indicator describing violation of at least one rule of the rule set.

7. The method of claim 6, wherein the at least one error indicator further describes at least one modification of the semiconductor process recipe to obviate the violation.

8. The method of claim 6, further comprising:
modifying the semiconductor process recipe using the computer to obviate the violation described by the at least one error indicator.

9. The method of claim 8, wherein the step of modifying comprises:
inserting new steps among the steps of the semiconductor process recipe.

10. The method of claim 1, further comprising:
displaying the validation data on a display coupled to the computer using a graphical user interface (GUI).

11. An apparatus for validating a semiconductor process recipe, comprising:
a memory configured to store recipe checker software and a plurality of rule sets describing operating windows for semiconductor process tools; and
a processor, coupled to the memory, configured to execute the recipe checker software to:
select a rule set describing from the plurality of rule sets for a semiconductor process tool;

check parameter values defined by steps in the semiconductor process recipe against limit-checking rules of the rule set to produce first results;

determine step types from the steps in the semiconductor process recipe using step definition rules of the rule set to produce second results;

check transitions between the step types against step transition rules of the rule set to produce third results; and generate validation data for use of the semiconductor process recipe with the semiconductor process tool based on the first, the second, and the third results.

12. The apparatus of claim 11, wherein the memory is configured to store configuration data for each of the semiconductor process tools, and wherein the processor is configured to select the rule set from the plurality of rule sets based on the configuration data for the semiconductor process tool.

13. The apparatus of claim 11, wherein the limit-checking rules define constraints for variable parameters of the semiconductor process tool, wherein the step definition rules define a set of requirements for each of the step types, and wherein the step transition rules define allowed and required transitions between step types.

14. The apparatus of claim 11, wherein the validation data includes at least one error indicator describing violation of at least one rule of the rule set.

15. The apparatus of claim 14, wherein the processor is further configured to:

modify the semiconductor process recipe using the computer to obviate the violation described by the at least one error indicator.

16. The apparatus of claim 11, further comprising:

a display, coupled to the processor, configured to display the validation data using a graphical user interface (GUI).

17. A non-transitory computer readable medium having instructions stored thereon that when executed by a processor cause the processor to perform a method of validating a semiconductor process recipe, comprising:

selecting a rule set describing an operating window for a semiconductor process tool;

checking parameter values defined by steps in the semiconductor process recipe against limit-checking rules of the rule set to produce first results;

determining step types from the steps in the semiconductor process recipe using step definition rules of the rule set to produce second results;

checking transitions between the step types against step transition rules of the rule set to produce third results; and generating, using the computer, validation data for use of the semiconductor process recipe with the semiconductor process tool based on the first, the second, and the third results.

18. The non-transitory computer readable medium of claim 17, wherein the limit-checking rules define constraints for variable parameters of the semiconductor process tool, wherein the step definition rules define a set of requirements for each of the step types, and wherein the step transition rules define allowed and required transitions between step types.

19. The non-transitory computer readable medium of claim 17, wherein the validation data includes at least one error indicator describing violation of at least one rule of the rule set, and wherein the at least one error indicator further describes at least one modification of the semiconductor process recipe to obviate the violation.

20. The non-transitory computer readable medium of claim 17, wherein the validation data includes at least one error indicator describing violation of at least one rule of the rule set, and wherein the method further comprises:

modifying the semiconductor process recipe using the computer to obviate the violation described by the at least one error indicator.

* * * * *